United States Patent

Magnussen

[19]

[11] Patent Number: 6,068,277
[45] Date of Patent: May 30, 2000

[54] ACCESS PLATFORM SYSTEM FOR EARTH-MOVING MACHINERY

[75] Inventor: Michael W Magnussen, Kingaroy, Australia

[73] Assignee: Access Innovations Pty, Ltd., Australia

[21] Appl. No.: 09/206,256

[22] Filed: Nov. 20, 1998

Related U.S. Application Data

[63] Continuation of application No. PCT/AU97/00301, May 16, 1997.

[30] Foreign Application Priority Data

May 20, 1996 [AU] Australia ....................................... 9931

[51] Int. Cl.⁷ ....................................................... B60R 3/02
[52] U.S. Cl. .............................. 280/166; 182/84; 182/127
[58] Field of Search ........................ 18/84, 127; 303/6.1; 280/166, 163, 164.1, 169

[56] References Cited

U.S. PATENT DOCUMENTS

| | | |
|---|---|---|
| 3,879,059 | 4/1975 | Gibes . |
| 3,912,298 | 10/1975 | Humphrey . |
| 3,986,724 | 10/1976 | Rivinius . |
| 3,997,183 | 12/1976 | Russey . |
| 4,021,071 | 5/1977 | Norman .............................. 280/166 X |
| 4,067,588 | 1/1978 | Morge et al. . |
| 4,264,084 | 4/1981 | Telles . |
| 4,720,116 | 1/1988 | Williams et al. . |
| 5,064,022 | 11/1991 | Graham . |
| 5,228,707 | 7/1993 | Yoder ..................................... 280/166 |
| 5,425,615 | 6/1995 | Hall et al. . |
| 5,547,040 | 8/1996 | Hanser et al. ....................... 280/166 X |
| 5,653,459 | 8/1997 | Murphy .................................. 280/166 |

FOREIGN PATENT DOCUMENTS

| | | |
|---|---|---|
| 244162 | 3/1987 | Germany . |
| 7-257281 | 10/1995 | Japan . |
| 477871 | 7/1975 | Russian Federation . |
| 716897 | 2/1980 | Russian Federation . |
| 2291013 | 1/1996 | United Kingdom . |
| 2291381 | 1/1996 | United Kingdom . |

*Primary Examiner*—Michael Mar
*Attorney, Agent, or Firm*—Parkhurst & Wendel, L.L.P.

[57] ABSTRACT

An access platform system for an earth-moving machine, such as a grader including a frame, plural ground-engaging drive members, an earth working tool and an operator station, which access platform system includes a first deck structure including deck members adapted to move between an upright storage position and a flat deployed position, stairs for providing access for personnel from ground level to the first deck structure and associated safety barriers. The first deck structure extends, in the deployed position, from the stairs to the operator station and the first deck structure allows, in the storage position, a substantially unobstructed view of at least a front portion of either a ground engaging drive member or the earth working tool from the operator station. The access platform system also includes a second deck structure interposed between the stairs and the first deck structure. The first deck structure includes a deck member adapted to extend along said frame adjacent to an engine compartment and substantially over at least one ground engaging drive member. The second deck structure may be mounted on a suspension beam of the machine such that it moves in cooperation with ground engaging drive members.

21 Claims, 13 Drawing Sheets

ACCESS PLATFORM SYSTEM FOR EARTH-MOVING MACHINERY

This is a Continuation of International Application No. PCT/AU97/00301 filed May 16, 1997.

BACKGROUND OF THE INVENTION (a) Field of the Invention

This invention relates to access platform systems for industrial machinery, in particular a platform arrangement which provides safe and convenient access for both machine operators and maintenance personnel to such machines. The invention is particularly concerned with access platform systems providing safe access to elevated positions on mobile earth-moving machines of all types, such as graders, bull-dozers and the like.

(b) Discussion of the Background Art

Many existing earth-moving machines merely include a step or ladder, perhaps associated with a hand rail or grip, facilitating access for operators to the control station of the machine, which station may be elevated some several metres from ground level. During operation of such machines, it is also sometimes necessary for operators to check the position or status of certain components of their machine, such as drive wheels, earth-working implements or other machine sub-systems, relative to geographical features, flora, fauna or man-made obstacles. This is especially the case when the extremities of such components are not clearly visible from the control station. A further example which may expose operators to the risk of a fall is when they simply wish to clean mud or grime from the external surfaces of cabins surrounding the control station.

Accordingly, there is a risk of injury to the operator should they slip and/or fall when climbing to an control station or standing in a precarious position elevated on the superstructure of the machine, whether to gain a better view of machine components or merely to clean cabin windows. This risk is multiplied where the machine includes earth-working implements with sharp edges or teeth, such as excavator buckets, grader blades or earth ripping tines, in the path of a potential fall. Machine operators have previously suffered serious injuries, including debilitating and potentially fatal head injuries, during falls of this nature.

Maintenance personnel and operators face similar risks when access to the engine or other operating systems, such as hydraulic lines or bearings, is required for inspection, cleaning or lubrication purposes. This is especially so when the machine is on-site rather than in a workshop where suitable access frames may be available.

An example of a prior arrangement of fixed access steps and platform with hand rails is shown in U.S. Pat. No. 4,067,588 in the name of Morge et al. and assigned to Caterpillar Tractor Co. Whilst an operator may be able to safely negotiate the rear of the cabin, this arrangement does not allow convenient access to the front of the cabin or to the power plant for maintenance purposes.

Several prior art arrangements merely comprise a simple retractable step or step and hand grip for facilitating access to an operator station as set out in the following documents. German (DD) Patent Application No. 244162 in the name of VEB Baumasch Halle describes entry steps on a grader which provide access to the driving position. The entry steps hinge at the rear end of the vehicle and are actuated by a mechanism which is interlocked with the vehicle hand controls for vehicle movement.

Japanese Patent Application No. 07-257281 in the name of Yutani Heavy Industries Ltd describes a motorised step disposed in a bracket located at the lower part of the entrance to the operator's cab on a hydraulic excavator. An electric motor rotates the step into position at an upper side on the entrance when the operator applies the brake.

U.S. Pat. No. 3,986,724 in the name of Rivinius describes a hydraulic power operated step which elevates the operator from a lower position, whereby the operator may mount the step near ground level, to an upper position adjacent the operator's cabin. This is a relatively complex and costly device in comparison to its single purpose operation, which still exposes an operator to the risk of a fall.

U.S. Pat. No. 3,997,183 in the name of Russey and assigned to Caterpillar Tractor Co describes an access step for a scraper. The step and grab handle are pivoted and interconnected for simultaneous movement, whereby movement of the grab handle extends the step to an operable position. Although much simpler in design than the Rivinius step, this device is relatively limited in function and would appear to require athleticism for the operators of larger machines.

Another aspect of desirable access arrangements for earthmoving machinery is that it should not normally obscure an operator's field of view and/or be in such a position that it might be damaged by soil, rocks or other debris which might be encountered during machine operations. The importance of not obscuring the operator's view has been recognised in U.S. Pat. No. 3,879,059 also in the name of Caterpillar Tractor Co describes a front wheel mudguard for a wheeled front-end loader which has a reinforced lattice type box section to maintain the operator's field of vision. The mudguard is detachably mounted on the excavator by releasable fastening means to facilitate replacement.

United Kingdom (GB) Patent Document No. 2291013 in the name of New Holland NV describes and access means for an agricultural vehicle such as a harvester. The access means includes a ladder and a platform operatively associated with one another so as to move from an operative position to a inoperative position. Similarly, United Kingdom (GB) Patent Document No. 2291381 in the name of Giat Industries describes a gangway and ladder assembly mounted on a motorised breakdown vehicle. The gangway and ladder are hinged to a platform on the chassis of the vehicle for movement between a raised position and a lowered position, for gaining access to the platform. The disclosed open platform arrangements pose a finite risk of injury should an operator fall from the ladder or platform when climbing to or from an elevated position.

BRIEF SUMMARY OF THE INVENTION (a) Object of the Invention

It is an object of the present invention to provide an access platform system for machines which overcomes or ameliorates at least some of the problems of the prior art.

It is a preferred object of the invention to provide an access platform system which provides convenient access to, and improves the safety of, earth-moving machinery for personnel operating or maintaining said machinery.

It is another preferred object of the invention to provide an access platform system which provides a substantially unobstructed view of an operative portion of earth-moving machinery from an operator station during normal operation of said machinery.

Further objects will be evident from the following description.

(b) Disclosure of the Invention

In one form, although it need not be the only or indeed the broadest form, the invention resides in an access platform system for mounting on a machine including a frame, a plurality of ground-engaging members, a tool means and an operator station, said access platform system comprising:

a first deck structure adapted to move between a deployed position and a storage position with the assistance of powered actuating means;

step means for providing access from ground level to the first deck structure;

safety barrier means associated with the first deck structure and the step means;

wherein the first deck structure is arranged, when in said deployed position, to extend from the step means to at least adjacent the operator station; and wherein the first deck structure is further arranged, when in said storage position, to allow a substantially unobstructed view of an operative portion of the earth moving machine, from the operator station.

Preferably the first deck structure is pivotally mounted with respect to said frame, such that at least one member of the first deck structure assumes an upright position when stored and a flat position when deployed.

The first deck structure may alternatively include at least one deck member which is slidably mounted with respect to the frame and assumes a flat position when deployed.

Preferably said first deck structure comprises a plurality of deck members, which members may be pivotally or slidably mounted as required.

Optionally one of said deck members is arranged to extend across a front side of said operator station.

Preferably the safety barrier means include hand rails along outer edges of the first deck structure.

If required, the safety barrier means include automatically tensioned filamentary members.

Preferably, the powered actuating means is operable in response to the manual operation of a control of the machine.

Most preferably the powered actuating means is interlocked with a brake control for the machine, such that the first deck structure may be deployed when the brake is applied and said first deck structure may be stored when said brake is released.

The step means may comprise a ladder or a set of stairs, as required.

Optionally the step means are adapted to be collapsible for assuming either a storage position or a deployed position.

Suitably the step means is pivotally mounted on the first deck structure for respective deployment or storage when said first deck structure is deployed or stored.

Preferably the safety barrier means includes hand rails provided on sides of the step means.

In preference, the access platform system comprises a second deck structure adapted to extend along said frame and substantially over at least one ground engaging member.

Suitably, said step means are mounted proximate to said second deck structure and said first deck structure is adjacent to said second deck structure.

Preferably the operative portion of the machine visible when the first deck structure is in the stored position includes at least a front portion of either the ground engaging member or the tool means.

In a further form, the invention resides in a mobile machine adapted for earth-moving including a frame, a plurality of ground engaging members supporting the frame, a tool means and an operator station mounted on said frame, wherein the mobile machine is characterised by an access platform system comprising:

a first deck structure adapted to move between a deployed position and a storage position with the assistance of powered actuating means;

step means for providing access from ground level to the first deck structure;

safety barrier means associated with the first deck structure and the step means;

wherein the first deck structure is arranged, when in said deployed position, to extend from the step means to at least adjacent the operator station; and wherein the first deck structure is further arranged, when in said storage position, to allow a substantially unobstructed view of an operative portion of the earthmoving machine, from the operator station.

In preference the tool means includes an earth-working implement.

The earth-moving machine may comprise a bull-dozer or grader or back-hoe or excavator or front-end loader or tractor or like machine.

Preferably the earth moving machine includes a second deck structure, which structure extends along the frame and substantially over at least one ground engaging drive member, said second deck structure mounted to move in cooperation with the ground engaging drive member(s).

Suitably, where the ground engaging drive members include either a pair of wheels or tracks mounted on a suspension beam, the second deck structure is also mounted on the suspension beam.

Most preferably, the first deck structure is arranged such that, when in the storage position, clearance is provided for movement of the second deck structure and the ground engaging drive members during travel of the suspension beam.

Preferably, where the frame includes an articulation, whereby the control station is laterally moveable with respect to selected ground engaging members, the first deck structure is mounted to move in cooperation with said control station.

In preference, either the first deck structure or the second deck structure is mounted adjacent an engine compartment of the mobile machine.

If required the access platform system may be arranged such that pivotally mounted deck members include a further pivotal mount for facilitating admittance to the engine and other internal systems of the machine.

BRIEF DESCRIPTION OF THE SEVERAL VIEWS OF THE DRAWINGS

To assist in understanding the invention preferred embodiments will now be described with reference to the following drawing figures in which.

DETAILED DESCRIPTION OF THE INVENTION

Figure 1:
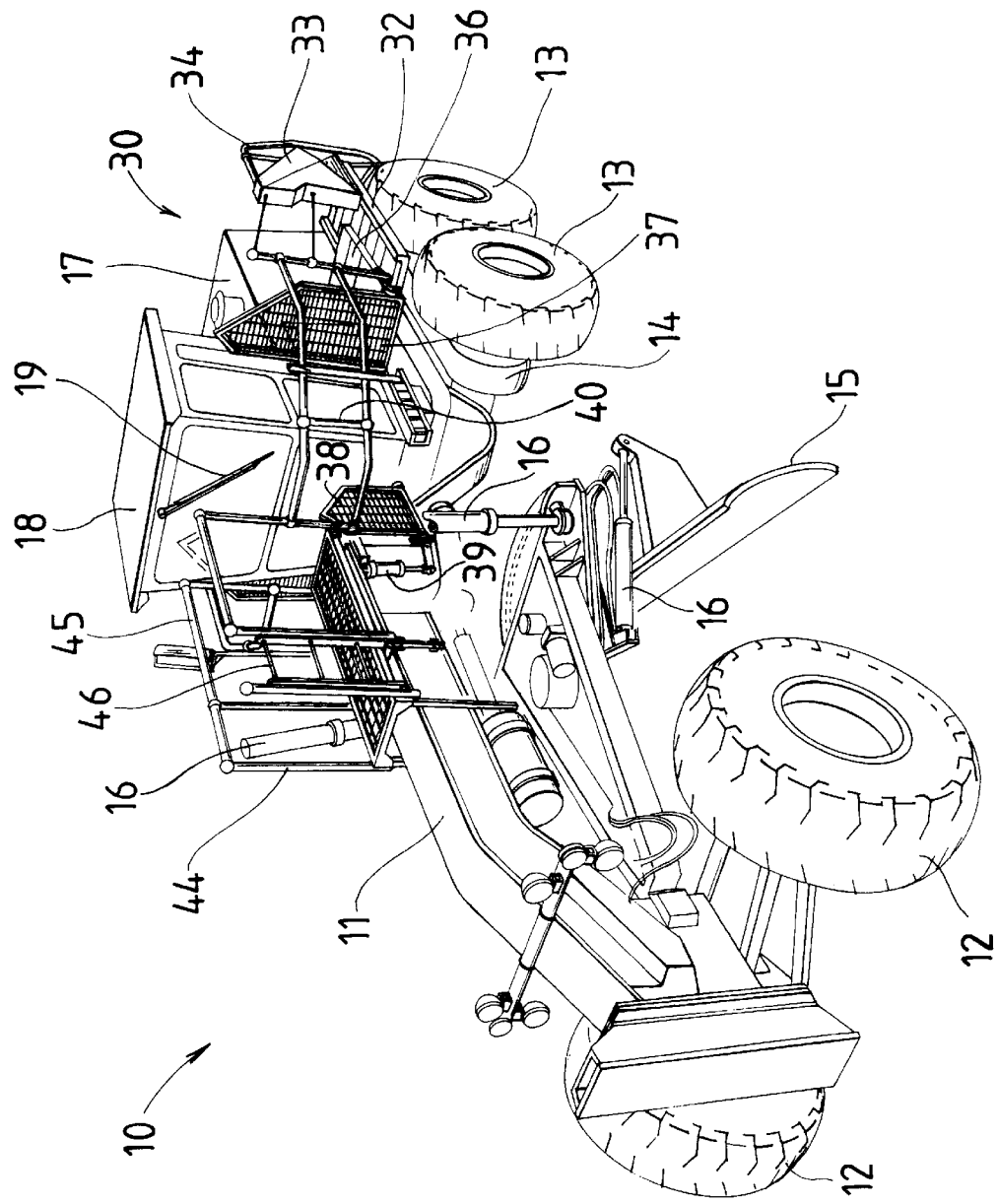
FIG. 1 is a perspective view of a first embodiment of the invention adapted for use with a grader.
Figure 2:
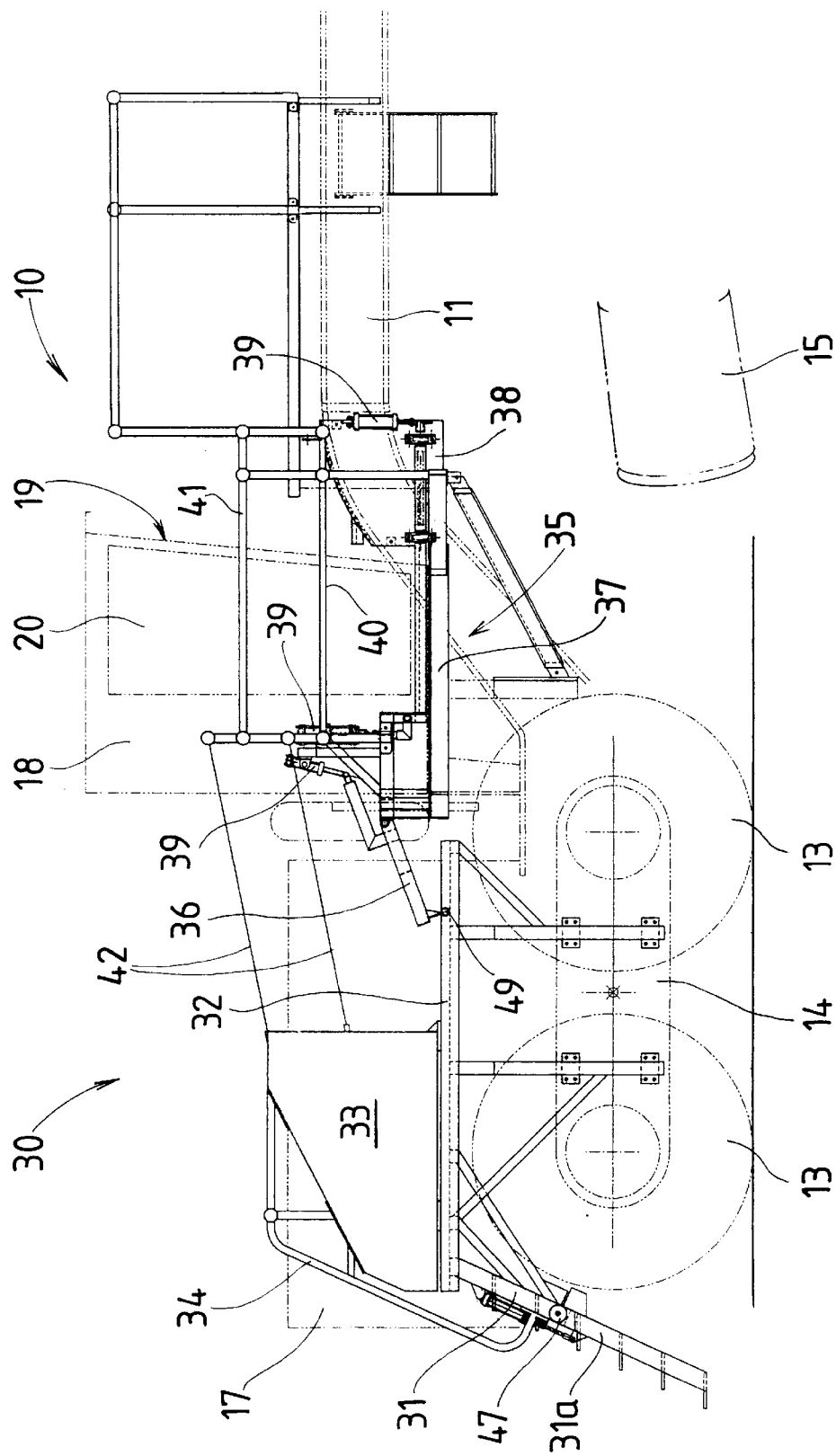
FIG. 2 is a side elevational view of the first embodiment.
Figure 3:
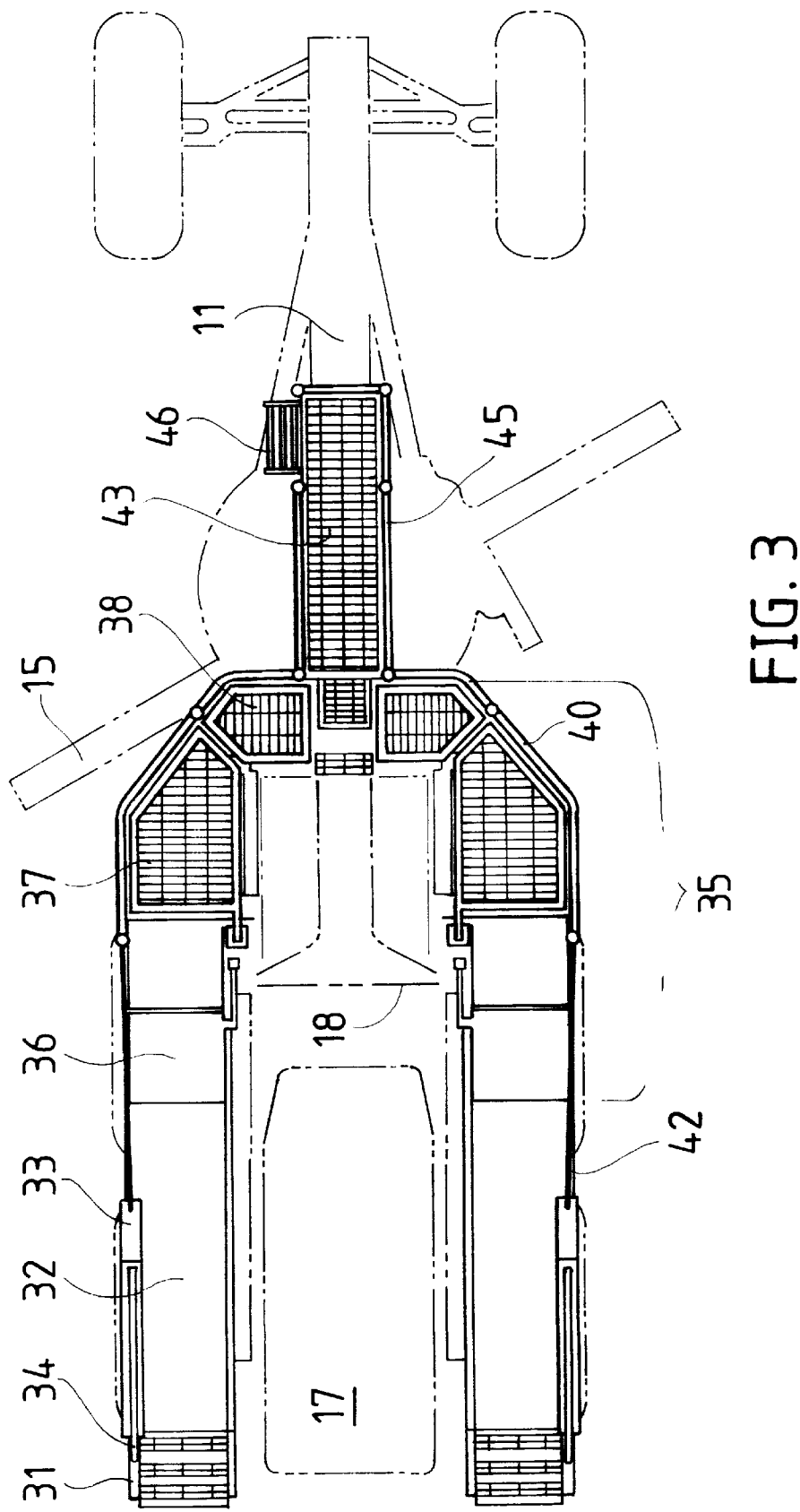
FIG. 3 is a top plan view of the first embodiment.

Referring generally to FIGS. 1, 2 and 3, an access platform system 30 of a first embodiment of the invention is mounted on either side of an earth-moving machine, here a grader 10. It will be appreciated, as shown in the second embodiment, that some machines may only require an access platform system mounted on one side. The grader is drawn in full in FIG. 1, but only in phantom in the remaining drawing figures for clarity purposes.

The grader 10 includes a frame 11, steer wheels 12, two pairs of drive wheels 13 mounted on respective suspended beams 14, an earth-working implement in the form of a blade 15 actuated by hydraulic rams 16, an engine compartment 17 and a cabin 18 enclosing an operator's control station 19. It will be appreciated that other tools, such as ground ripping tines (see FIG. 8), may also be fitted to such a grader. These and other components of a conventional grader are only described as necessary in relation to the discussion of the embodiment of the access platform system.

Figure 6:
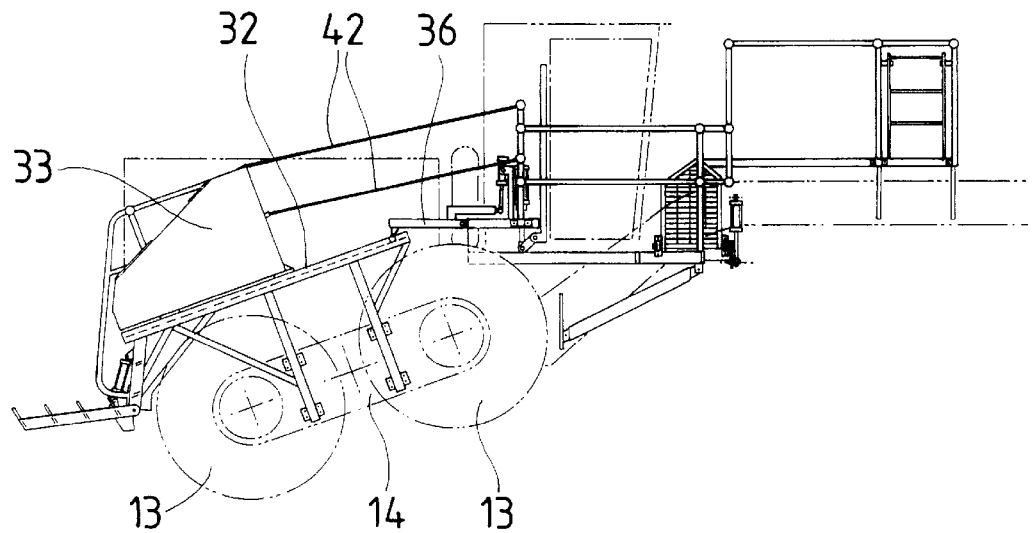
FIG. 6 is a side elevational view of the first embodiment with the grader suspension in an inclined position.
Figure 7:
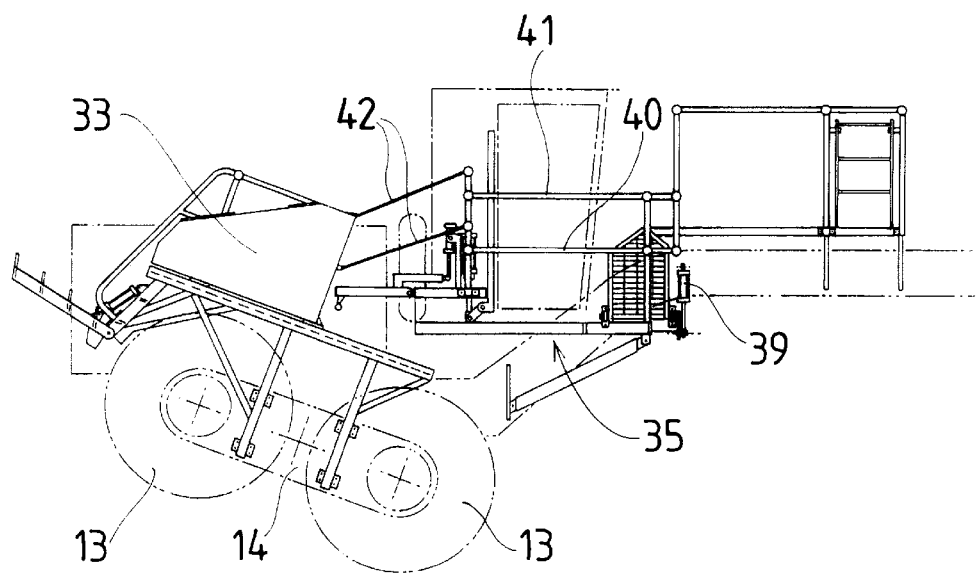
FIG. 7 is a further side elevational view of the first embodiment with the grader suspension in a declined position.

The access platform system 30 includes step means in the form of a set of stairs 31, providing access from ground level to a fixed deck structure 32. The fixed deck structure 32 extends along one side of the grader 10 and is located above the drive wheels 13 and adjacent to the engine compartment 17. The steps 31 are disposed behind the rearmost of the drive wheels in the embodiment. A safety barrier 33 incorporating a hand rail 34 is located along an outer edge of the stairs 31 and the fixed deck structure 32. The fixed deck structure 32 is mounted on the suspension beam 14 such that the steps 31, fixed deck structure 32 and the safety barrier 33 move in concert with the drive wheels 13. This mounting arrangement for the fixed deck structure 32 provides sufficient clearance for the drive wheels 1 3 during suspension travel, as illustrated by the possible positions of the drive wheels 13 as shown in FIGS. 6 and 7 of the drawings.

The fixed deck structure 32 includes a deck member which is typically constructed of a suitable gauge metallic plate material, such that it may also function as a mudguard for the drive wheels 13. The plate material is preferably provided with a textured surface to reduce slippage in wet and/or muddy conditions. Similar considerations apply to the choice of material for the stairs 31. Other suitable materials may also be specified, for example some plastics materials have a superior strength-to-weight ratio when compared to metal, and may be ideal for such an application.

The access platform system 30 also includes a moveable deck structure 35 comprising a plurality of deck members (described below) which, when deployed as shown in FIG. 2, extend from over a forward end of fixed deck structure 32 to a position adjacent the operator's control station 19, which position is conveniently adjacent a door 20 to the control cabin 18 of the machine. It would be preferable in the embodiment, if the door 20 to the control cabin 18 was hinged at a front side of the opening, rather than at the front side of the opening as typical of existing doors for grader cabins.

Figure 5:
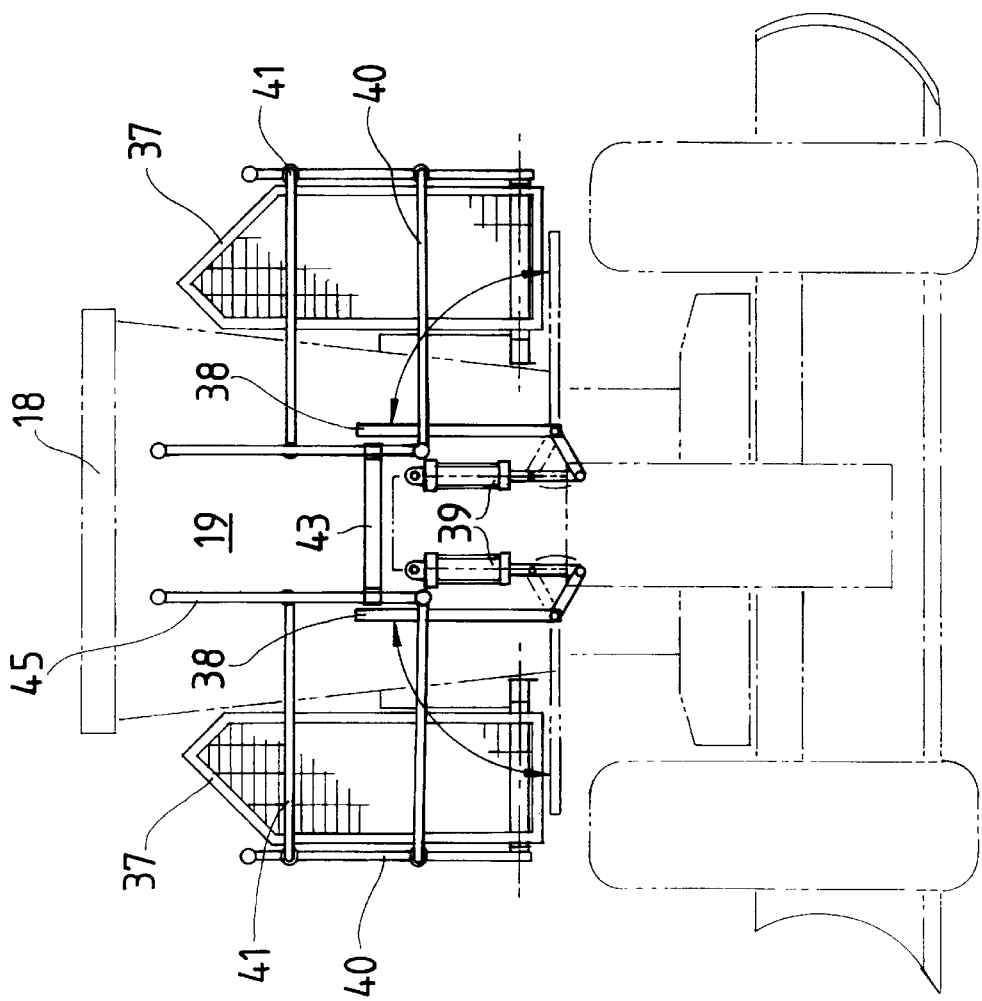
FIG. 5 is a front elevational view of the first embodiment.

The movable deck structure 35 is comprised of a number of leaves or deck members 36, 37, 38 pivotally mounted with respect to the control cabin 18, see FIGS. 1 and 3. A floating deck member 36 is mounted in overlapping relation with a forward end of the fixed deck structure 32, as shown in FIG. 2. A longitudinally extending deck member 37 is pivotally mounted on the frame 11 adjacent a rearward edge of the deck member, for assuming either a storage position, wherein it is upright (as shown in FIGS. 1 and 5) or a deployed position, wherein it lies flat (as shown in FIGS. 2 and 3).

The movable deck structure 35 further includes a laterally extending deck member 38, which extends across a front side of the operator station 19. The lateral deck member 38 is pivotally mounted on the frame 11 at an inner edge of the deck member for similarly assuming either an upright storage position or a flat deployed position, as depicted in FIG. 5.

Each of the deck members 36, 37, 38 of the structure 35 are moved with the assistance of respective actuating means, here in the form of hydraulic cylinders 39. Suitably the actuating means are interlocked with a manual park brake control, such that the moveable deck members are deployed when said park brake is applied by the operator and the members are stored when said park brake is released. The deck members are typically constructed of perforated or mesh sheets of metallic material, such as expanded steel mesh, which material is used for the longitudinal deck member 35 and lateral deck member 38 of the embodiment.

A further safety barrier 40, including hand-rails 41, is also provided adjacent the outer edges of the members of the movable deck structure 35. In an optional arrangement (not shown), the further safety barrier 40 and hand rails 41 may also fold or telescope into a storage position when the deck members of the movable deck structure 35 are moved into the storage position by the actuating means 39, thereby further improving the machine operator's view from the control station.

In an alternative arrangement, a moveable deck structure could include deck members slidably mounted in a flat position under the control cabin 18 for deployment as desired.

Figure 4:
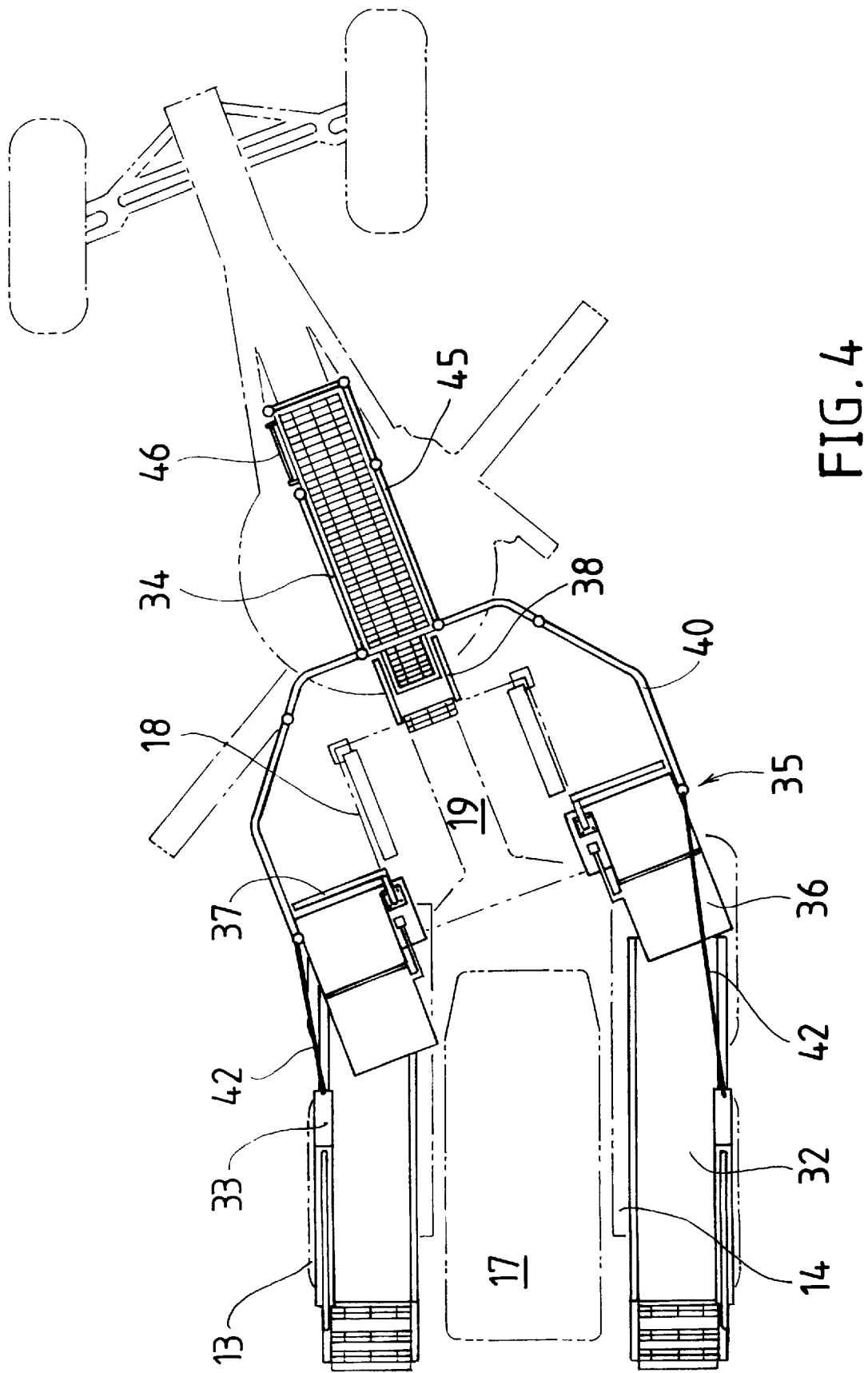
FIG. 4 is a top plan view of the first embodiment with the grader in an articulated position.

FIG. 2 shows the movable deck structure 35 mounted slightly above the level of the fixed deck structure 32, specifically to allow the floating deck member 36 to partially overlap the fixed deck structure 32 when the floating deck member is deployed. This mounting arrangement is particularly suitable for use in relation to articulated earth-moving machines, as illustrated in FIG. 4. Also shown in FIG. 2 is a transitional safety barrier arrangement which includes, in the embodiment, a pair of filamentary members in the form of multi-strand steel cables 42 which each extend from the safety barrier 33 mounted on the fixed deck structure 32, to the further safety barrier 40 mounted on the movable deck structure 35. The filamentary members are automatically placed under a pre-determined tension by tensioning means (not shown) so as to maintain an effective barrier irrespective of any articulation setting of the machine (see FIG. 4)

or position of the machine on any incline or decline (see FIGS. 6 and 7).

FIG. 3 is a top plan view of the access platform system 30, when in the deployed position it will be appreciated that, when an access platform system is mounted on both sides of the grader 10, a walk-way bordered by a safety barrier means extends from the rear of the grader past the engine compartment 17 on one side around the control cabin, past the opposite side of the engine compartment and back to the rear of the grader. Accordingly, personnel have convenient access to either side of the engine compartment 17 and to the control cabin 18. FIG. 3 also shows an optional central deck structure 43 which extends forward of the control cabin 18 over the machine frame 11. The central deck structure includes its own safety barrier 44 with hand rails 45 and a manually deployable ladder 46. The ladder 46 provides a secondary point of egress for a machine operator, should it be required in an emergency situation such as a fire in the machines engine compartment.

FIG. 4 shows the grader 10 configured in a fully articulated position, facilitated by a lockable pivot (not shown) in the frame 11 disposed in the vicinity of the control station 19. A front portion of the grader, including the control station 19, surrounding cabin 18 and associated movable deck structure 35 of the access platform system 30, pivot with respect to an assembly including the engine compartment 17, suspension beams 14 and drive wheels 13 of the grader 10, along with the associated fixed deck structure 32. The drawing illustrates how the partial overlap of the floating deck member 36 and the fixed deck structure 22 is capable of maintaining a continuous walk-way from the steps 31 to the control cabin 18, even when the grader is locked in an articulated position.

FIG. 5 is a view looking towards the front of the grader 10 showing the longitudinal deck member 37, the lateral deck member 38, the further safety barrier 40 and hand rail 41 of the movable deck structure 35, on each side of the grader. The deck members 37, 38 are shown in the upright storage position, typically employed whilst the grader is in motion during operations.

FIG. 6 shows an extreme position of the suspension beam 14 and drive wheels 13 which may be experienced when the grader 10 is negotiating an incline. As discussed above, the fixed deck structure 32 is mounted on the suspension beam 14. The arrangement of the safety barrier 33 and the stored floating deck member 36 of the movable deck structure 35 provide clearance for the fixed deck structure 32 and the frontmost of the drive wheels 13. Similarly, FIG. 7 shows another extreme position of the suspension beam 14 and drive wheels 13 which may be experienced when the grader is negotiating a decline. The operation of the tensioned multi-stand steel cables 42 comprising the transitional safety barrier is also clearly apparent from these drawings.

Figure 8:
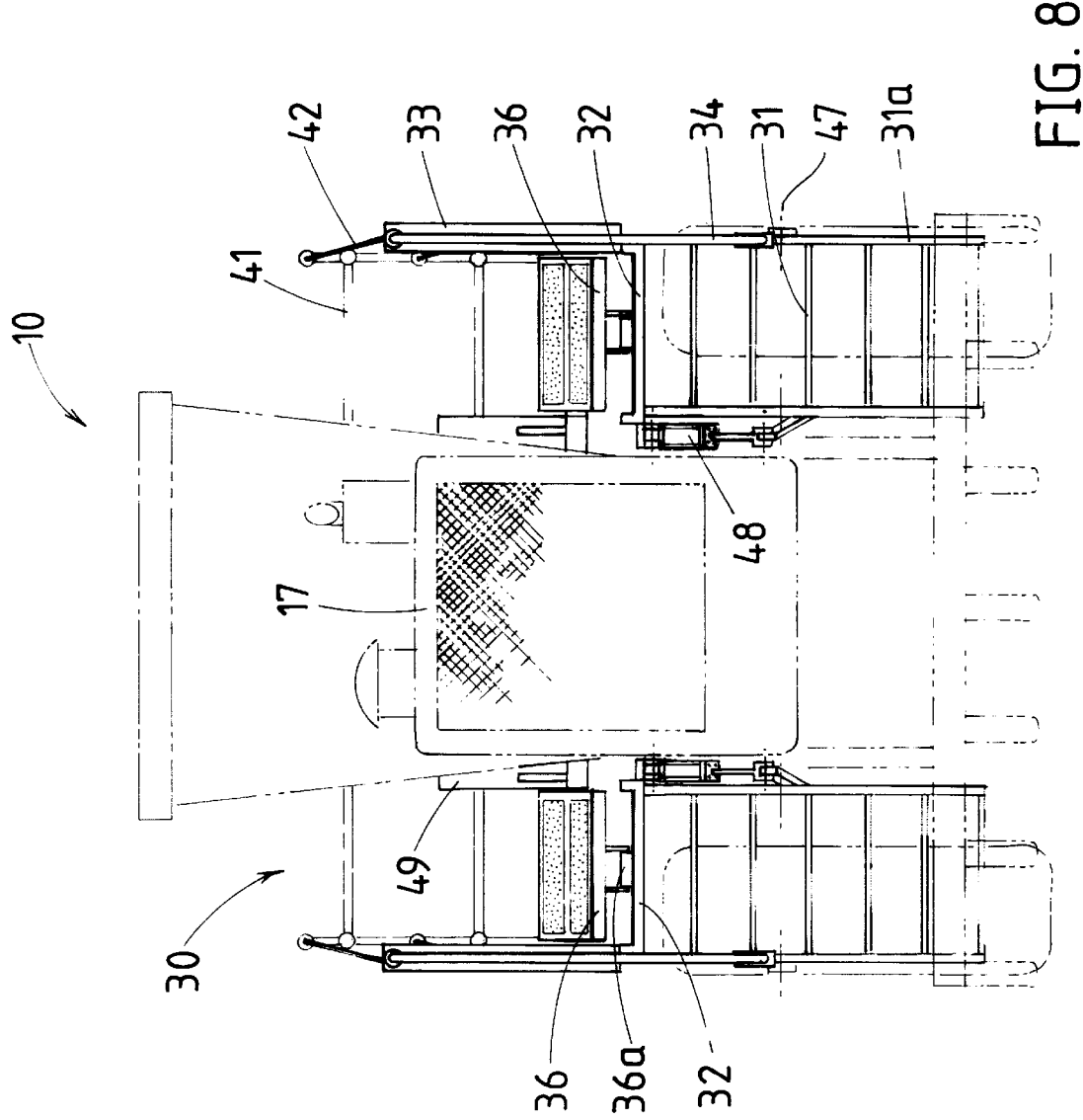
FIG. 8 is a rear elevational view of the first embodiment.

FIG. 8 is a rear elevational view of the access platform system 30 mounted on a grader 10. The stairs 31 providing access from ground level to the deck member of the fixed deck structure 32 include a pivot 47 (see also FIG. 2) such that a lower portion 31a of the stairs is collapsible or foldable. Further actuating means 48 are provided to pivot the lower stair portion 31a upward in concert with the storage of the moving deck members 37, 38. A stored position of the stairs is illustrated in FIG. 6, wherein the additional ground clearance is apparent. A roller 36a, provided on the underside of the floating deck member 36, for engaging the deck member of the fixed deck structure 32 is illustrated in the drawing. A cowl 49 provided for covering the actuating means 39 for the longitudinal deck member 37 and the lateral deck member 38 is also shown.

The access platform system of the first embodiment provides a stable non-slip walk-way for operators and maintenance personnel alike, extending from the rear of the grader adjacent to the engine compartment, past the operator station and around to the front side of the control cabin. The access platform system also includes, on its outer edges, a series of safety barriers with hand rails providing support for personnel in the event of loss of footing.

Figure 9:
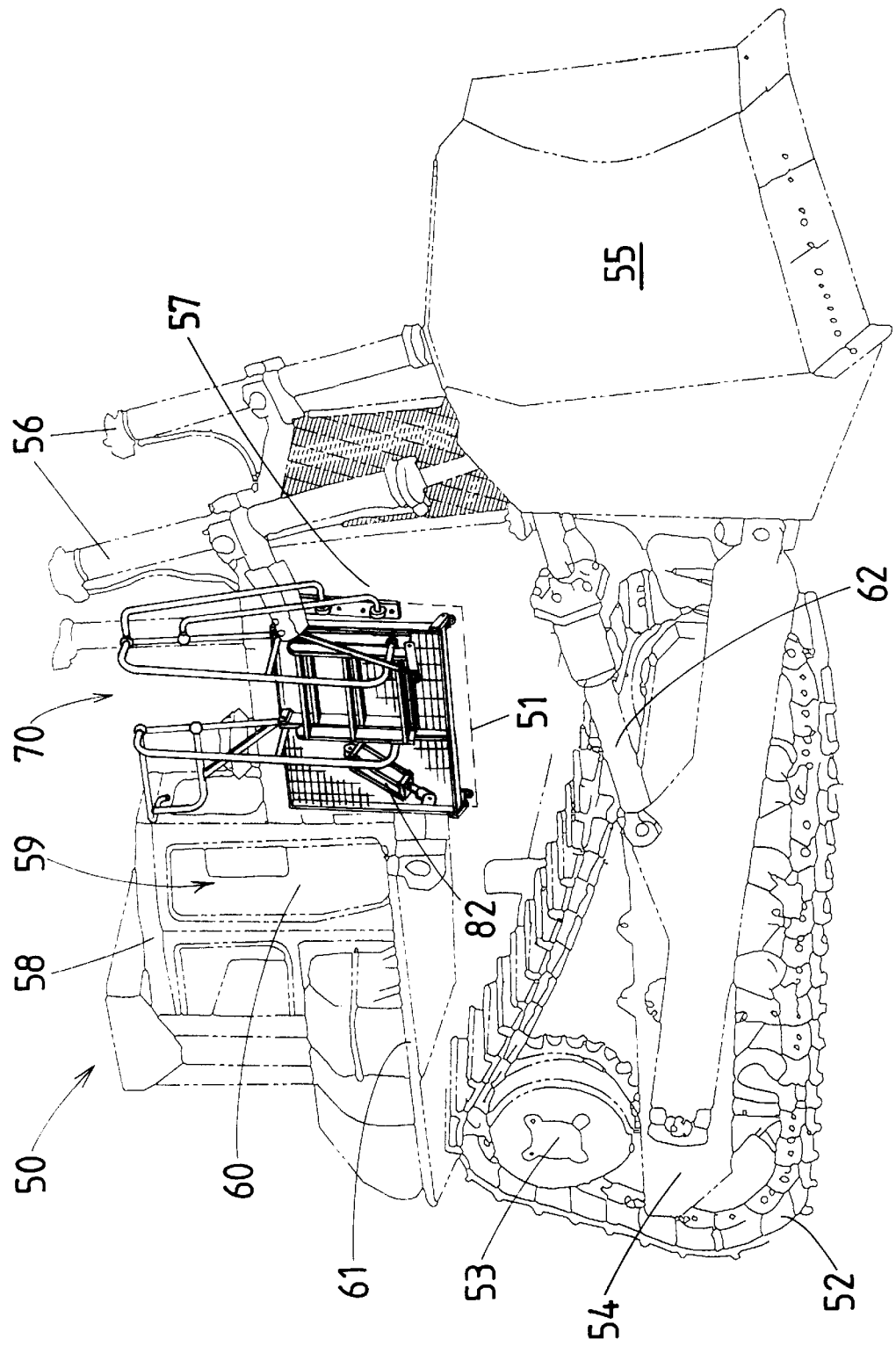
FIG. 9 is a perspective view of a second embodiment of the invention adapted for use with a bull-dozer.

A second embodiment of the invention, adapted for use on a bull-dozer will now be described with reference to FIGS. 9 to 12 of the drawings. Turning to FIG. 9, the access platform system 70 of the second embodiment is shown mounted on a bull-dozer 50. The bull-dozer includes a frame 51 (concealed by body panels in the drawing), a ground engaging drive member in the form of an endless track 52, which is driven by a drive sprocket 53 and carried on a suspension beam 54.

The bull-dozer further includes an earth-working implement, in the form of a shallow bucket-type blade 55 actuated by hydraulic rams 56, 62 and supported by a push arm. An operator's cabin 58 surrounding a control station 59 is disposed behind the engine compartment 57 of the bull-dozer 50. The superstructure of the bull-dozer includes a shelf 61 extending from under the door 60 to the cabin 58. As indicated above in relation to the first embodiment, the features of a conventional bull-dozer are only described for the purposes of providing a context for illustrating the present invention.

Figure 10:
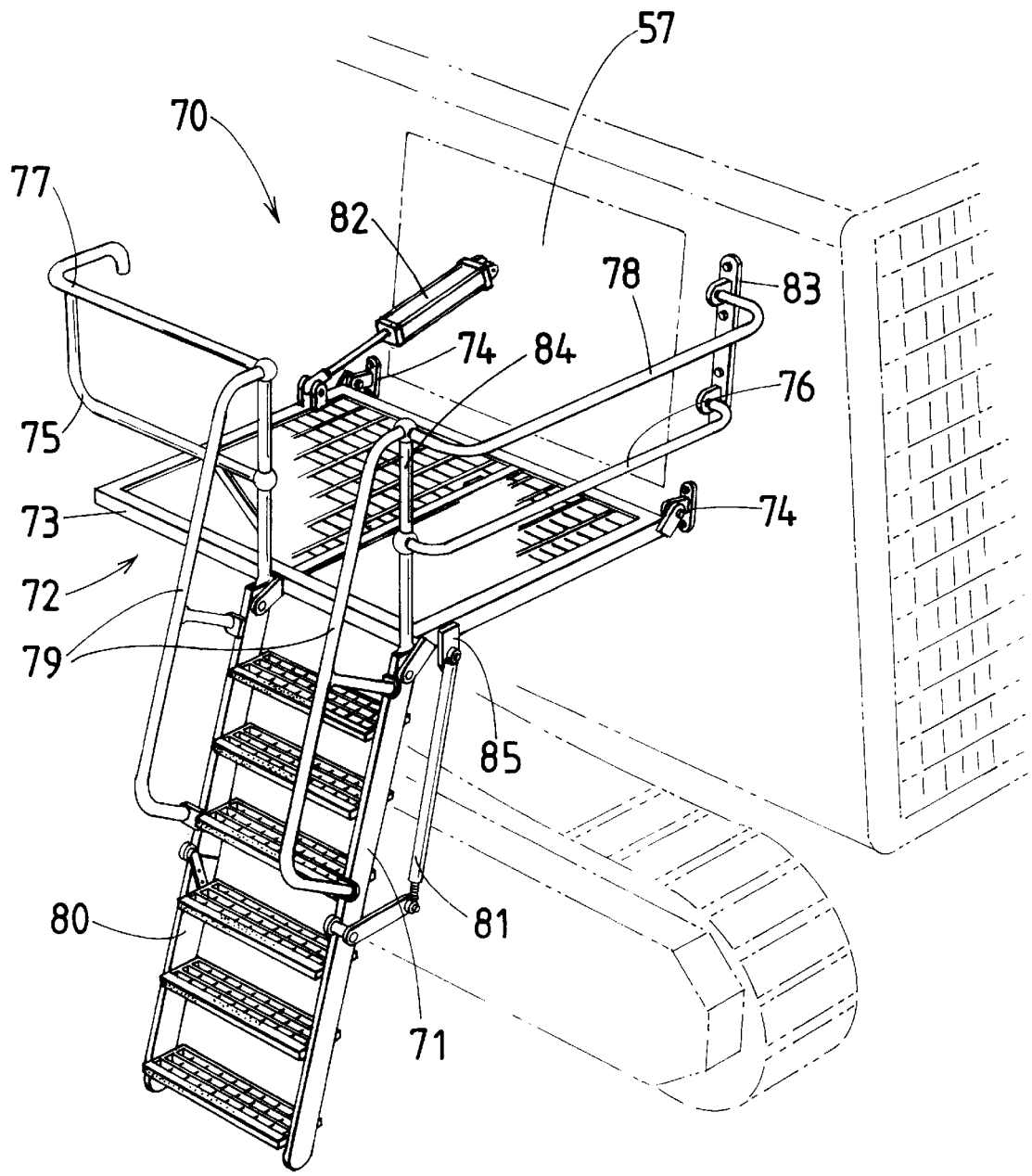
FIG. 10 is a perspective view of the second embodiment shown in a deployed position on the bull-dozer.

With reference to FIG. 10, the access platform system 70 of the embodiment includes step means in the form of a set of stairs 71 and a moveable deck structure 72. The moveable deck structure includes a deck member 73, arranged for pivotal mounting 74 on the bull-dozer frame 51 adjacent one side of the engine compartment 57. Safety barrier means 75, 76 are located on outer edges of the deck member 73, and include respective hand rails 77, 78. The stairs 71, which also incorporate a safety barrier with hand rails 79, are in turn pivotally mounted 85 on the deck member 73. Furthermore the stairs are collapsible, having a folding lower portion 80 with an associated crank mechanism 81.

Movement of the deck structure 72 is facilitated by an actuating means, here in the form of a hydraulic cylinder 82, although other actuators such as rotary motors may be employed. The laterally extending rails 76, 78 of the safety barrier associated with the forward edge of the deck member 73 are pivotally mounted at each end. The inner ends of the rails are journalled in a bracket 83 mounted on the frame of the bull-dozer adjacent the engine compartment 57. Whilst the outer end of the rails 76, 78 are journalled in apertures provided in a support post 84 fixed to an upper end of the stairs 71.

Figure 12:
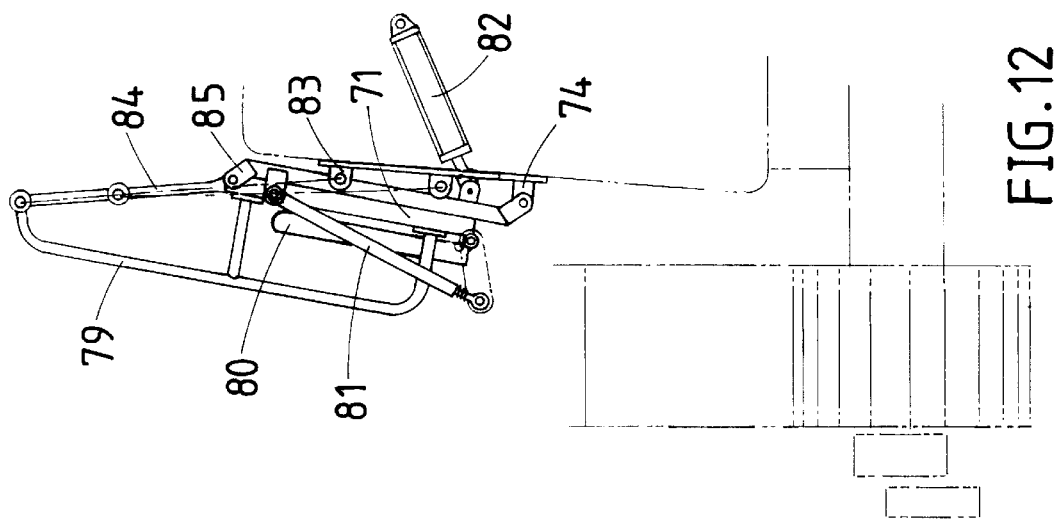
FIG. 12 is a front elevational view of the second embodiment, shown in a stored position.

It will be appreciated that, as the deck member 73 turns on the pivotal mounts 74 under the influence of the hydraulic cylinder 82, the pivotally mounted rails 76, 78 effectively form a quasi-parallel linkage. Furthermore the crank mechanism 81 attached to the lower portion 80 of the stairs 71, urges the lower portion to fold with respect to the upper portion thereof. The linkage arrangement of the embodiment thus allows the access platform system of the embodiment to be stored in a compact fashion, as illustrated in FIG. 12. Preferably the access storage system may only be deployed when the bull-dozer's park brake has been applied, as a further safety measure.

Figure 11:
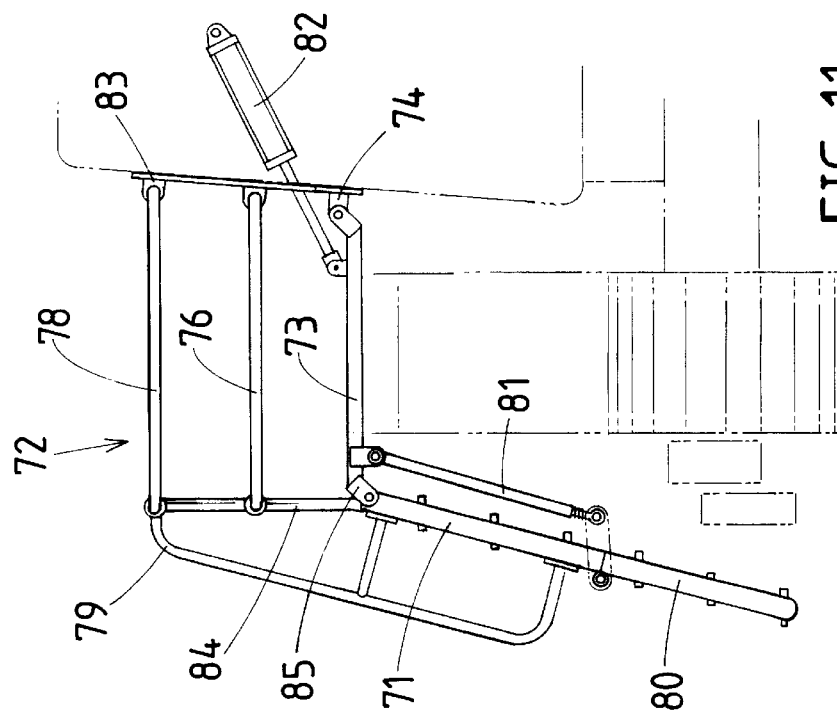
FIG. 11 is a front elevational view of the second embodiment, shown in a deployed position.

The movable deck structure 72 is thus moveable between a flat deployed position, facilitating convenient access to the operator's cabin as shown in FIGS. 9 and 12, and an upright stored position, wherein the operator has a substantially unobstructed view of the front portion of the track 52 and/or the blade 55 (depending on the position of the blade at the time) as shown in FIGS. 10 and 11.

It should be noted that, the stairs 71 are preferably fully supported by the moveable deck structure 72 and need not rely upon the ground for support, which ground may be uneven or broken. Furthermore when in the deployed position, the deck member 73 is disposed adjacent to the shelf 61 and thus also the operator's control station 59. In other embodiments, for example adapted to a bull-dozer which does not include a shelf 61 or like structure, the movable platform 72 may include additional deck members and safety barriers whereby an operator climbing to the elevated control station 59 may do so safely and conveniently.

It will be appreciated that, in bull-dozers without an access system 70 in accordance with the invention, operators must climb over the push arm 62 for the blade 55 and onto the track 52, both of which may be covered in slippery mud or loose gravel. From the track 52, operators must then hoist themselves onto the shelf 61 in order to enter the cabin 58 via door 60. The access platform system 70 of the embodiment ameliorates the risks associated with climbing over such machinery, by providing stairs 71 and a deck structure 72 with associated safety barriers facilitating convenient access to an elevated control station 59 when deployed. When the structure is stored, the operator is afforded a substantially unobstructed view of operative portions of the machine from the control station. Storage of the system also reduces the possibility of collision with obstacles during machine operations.

A third embodiment of the invention, also adapted for use on a bull-dozer, will now be described with reference to FIGS. 13 to 15 of the drawings. The access platform system of the third embodiment comprises a deck structure 90 including a movable deck member 91, a safety barrier with a support post 92 and a hand rail 93, and a set of stairs 94 pivotally attached to an outer edge of the deck member 91. The stairs 94 include a collapsible lower portion 96 and a hand rail 97. A further safety barrier 98 is mounted on a pre-existing platform 99 on the bull-dozer 100.

Figure 13:
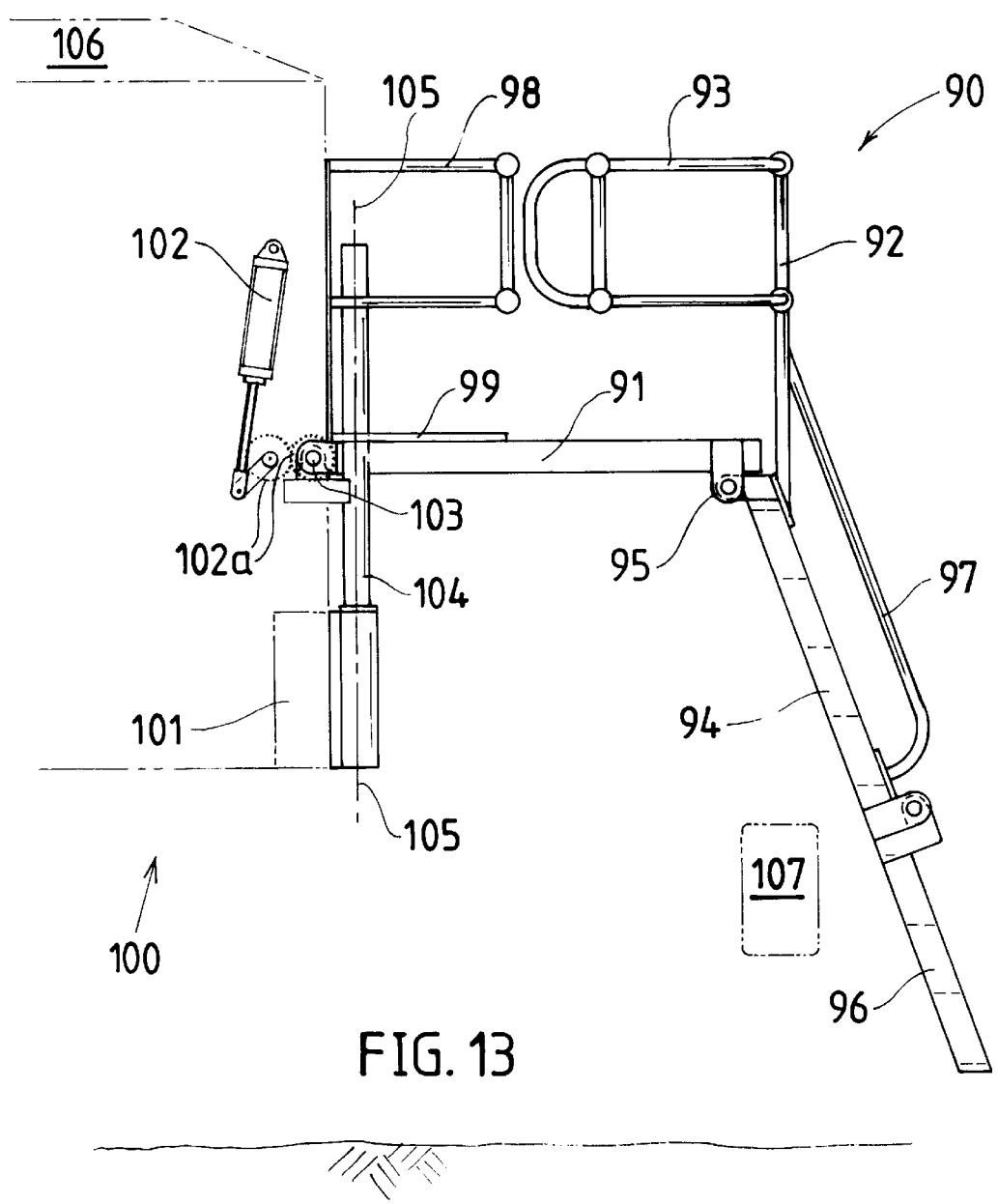
FIG. 13 is a front elevational view of a third embodiment of the invention also adapted to use on a bull-dozer, shown in a deployed position.
Figure 14:
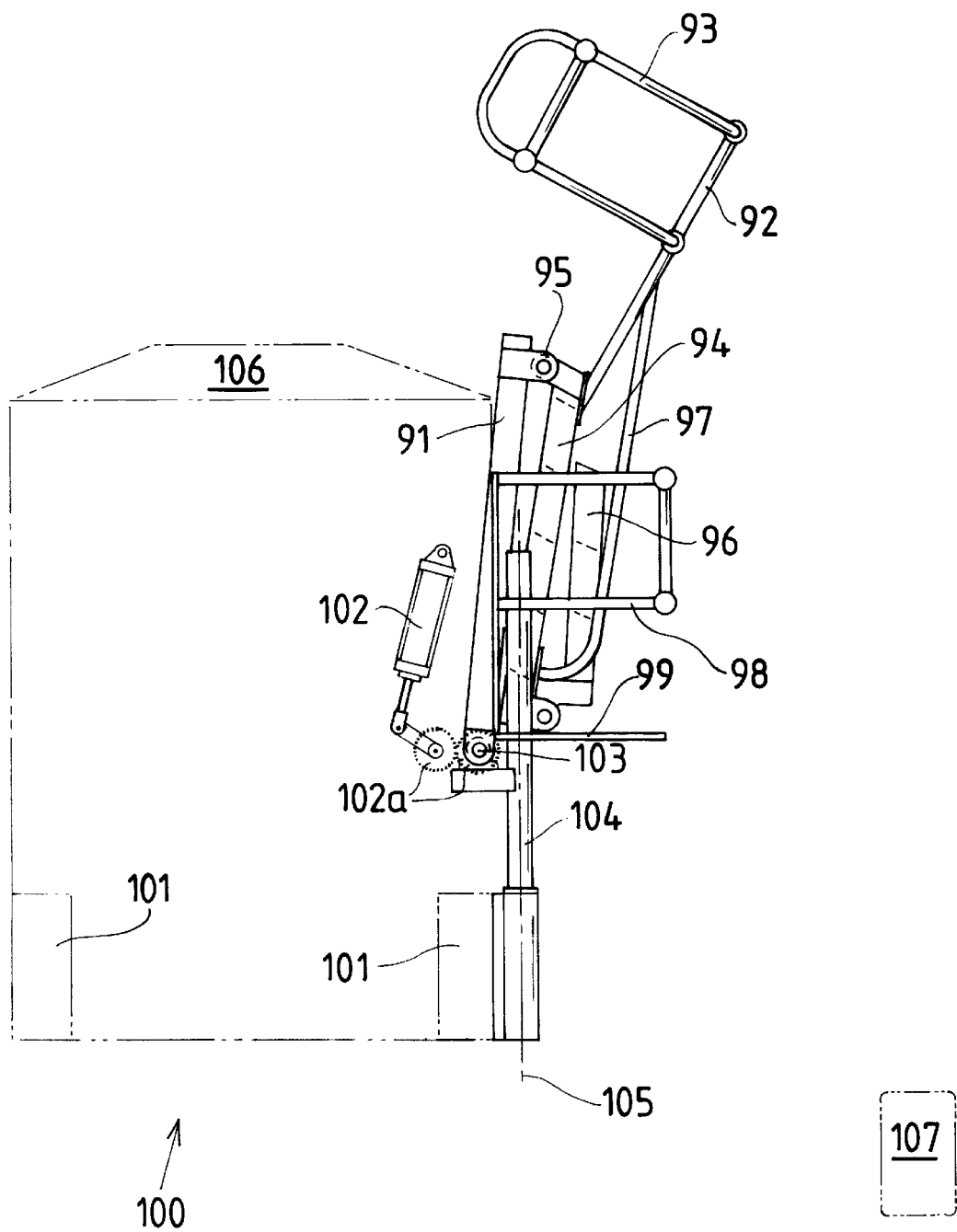
FIG. 14 is a front elevational view of the third embodiment, shown in a stored position.
Figure 15:
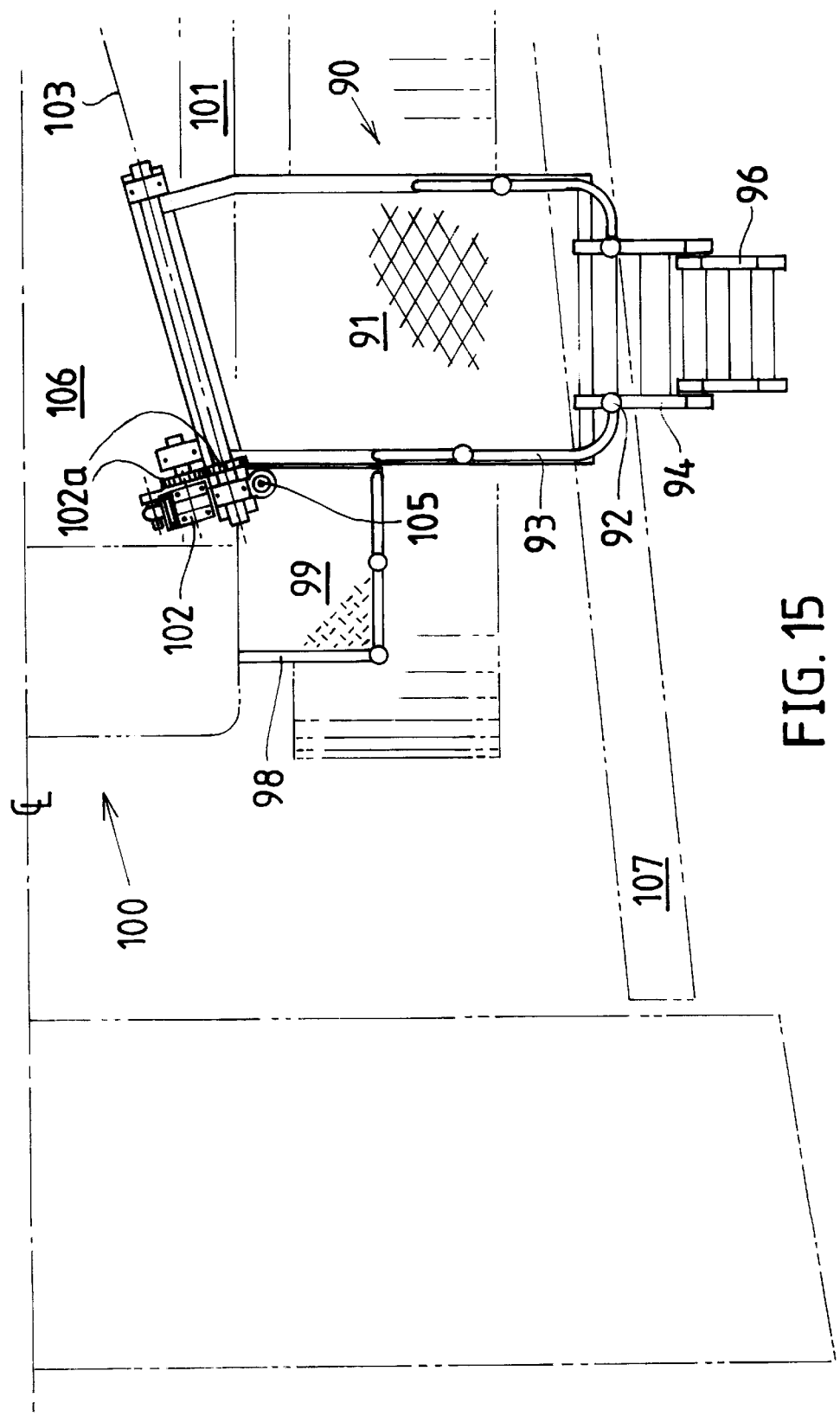
FIG. 15 is a top plan view of the third embodiment.

The deck structure 90 is movable between a deployed position as illustrated in FIG. 13 and a stored position as illustrated in FIG. 14, whereby the deck member 91 pivots about a substantially horizontal pivot axis 101 (as shown in FIG. 15) between a flat position and a upright position, respectively. An actuator 102 which drives a gear set 102a coupled to the deck structure assists with pivoting the deck member 91 and stairs 94 to and from the storage position. The deck structure 90 is further characterised by the manner of pivotal mounting to the chassis 103 of the bull-dozer, which employs an upright pivot post 104. The pivot post arrangement facilitates admittance to operative portions of the machine, here the engine compartment 106, when the deck structure 90 is in a stored position. In the embodiment, the stored deck structure may be pivoted, about a substantially vertical axis 105, away from a position where the upright deck member 91 is adjacent to and otherwise covers a portion of the engine compartment 106. This arrangement facilitates admittance to the engine for the purposes of periodic maintenance and the like.

In the deployed position the stairs 94 of the deck structure 90 are supported over the push arm 107 of the dozer, allowing safe and convenient access to the operator station.

In another embodiment, the access platform system of the invention may also be conveniently demountable from the earth-moving machine, in order to facilitate access for deep maintenance procedures and/or repairs to said machine. The access platform system may also be adapted to cooperate with or supersede existing access steps or ladders, such that when the access platform system is demounted the existing steps or ladders provide minimum access to the operator station.

Throughout the specification the aim has been to describe the preferred embodiments of the invention without limiting the invention to any one embodiment or specific collection of features. In particular the embodiments described herein are adapted for fitment to a grader and a bull dozer, however the invention made by adapted for fitment to earth-moving and other large machinery of all types including fixed, articulated or rotating frame machines.

I claim:

1. An access platform system for mounting on a mobile earth-moving machine including a frame, a plurality of ground engaging members supporting the frame, a tool means and an operator station mounted on the frame, said access platform system comprising:

(a) a first deck structure mountable on a frame of a mobile earth-moving machine and adapted to move between a deployed position and a storage position with the assistance of powered actuating means;

(b) a second deck structure mountable on a frame of said mobile earth-moving machine and adapted to extend along such frame and substantially over at least one ground engaging member;

(c) step means attached to the second deck structure and providing access from ground level to the deck structures;

(d) safety barrier means associated with the deck structures and the step means;

(e) wherein the first deck structure is arranged
      (i) where in the deployed position, to extend from the second deck structure to at least adjacent the operator station, and
      (ii) when in the storage position, to allow a substantially unobstructed view of an operative portion of the earth-moving machine to which the structure is attached from the operator station of the machine; and (f) wherein the second deck structure is arranged for movement in cooperation with suspension travel of at least one ground engaging member.

2. An access platform system as claimed in claim 1 wherein at least one member of the first deck structure is pivotally mounted with respect to said frame, whereby the deck member assumes an upright position when stored and a flat position when deployed.

3. An access platform system as claimed in claim 1 wherein at least one member of the first deck structure is slidably mounted with respect to the frame and assumes a flat position when deployed.

4. An access platform system as claimed in claim 1 wherein said first deck structure comprises a plurality of deck members, which deck members may be pivotally or slidably mounted as required.

5. An access platform system as claimed in claim 4 wherein at least one of said deck members is arranged to extend across a front side of said operator station.

6. An access platform system as claimed in claim 1 wherein the safety barrier means include hand rails provided along outer edges of the first deck structure.

7. An access platform system as claimed in claim 1 wherein the safety barrier means include automatically tensioned filamentary members.

8. An access platform system as claimed in claim 1 wherein the powered actuating means is operable in response to a manual control of the machine.

9. An access platform system as claimed in claim 8 wherein operation of the powered actuating means is interlocked with a brake control for the machine, such that the first deck structure may be deployed when the brake is applied and said first deck structure may be stored when said brake is released.

10. An access platform system as claimed in claim 1 wherein the step means comprise a ladder or a set of stairs.

11. An access platform system as claimed in claim 10 wherein the step means are adapted to be collapsible for assuming either a storage position or a deployed position.

12. An access platform system as claimed in claim 1 wherein the safety barrier means includes hand rails provided on sides of the step means.

13. An access platform system as claimed in claim 1 wherein said second deck structure is constructed of plate material in order to function as a mudguard for said at least one ground engaging member.

14. An access platform system as claimed in claim 1 wherein the operative portion of the machine includes at least a front portion of either a ground engaging member or the tool means.

15. An access platform system according to claim 1 mounted on a mobile machine adapted for earth moving.

16. A mobile machine as claimed in claim 15 wherein the tool means includes an earth-working implement.

17. A mobile machine as claimed in claim 16 wherein the machine comprises a grader.

18. A mobile machine as claimed in claim 15 wherein said at least one ground engaging member includes a pair of wheels or a track, mounted on a suspension beam, and said second deck structure is also mounted on the suspension beam.

19. A mobile machine as claimed in claim 18 wherein the first deck structure is arranged such that, when in the storage position, clearance is provided for movement of the second deck structure and the ground engaging members during travel of the suspension beam.

20. A mobile machine as claimed in claim 15 wherein the frame of the machine further includes an articulation, whereby the control station is laterally moveable with respect to selected ground engaging members, and said first deck structure is mounted to move in cooperation with said control station.

21. A mobile machine as claimed in claim 15 wherein said second deck structure is mounted adjacent an engine compartment of the mobile machine.

* * * * *